United States Patent [19]

Penners

[11] Patent Number: 5,793,758
[45] Date of Patent: Aug. 11, 1998

[54] METHOD AND SYSTEM FOR WIRELESS COMMUNICATION OF A DATAGRAM

[75] Inventor: John Henry H. Penners, Boulder, Colo.

[73] Assignee: U S West, Inc., Englewood, Colo.

[21] Appl. No.: 223,888

[22] Filed: Apr. 6, 1994

[51] Int. Cl.⁶ .................................................. H04J 13/00
[52] U.S. Cl. ........................................ 370/342; 375/205
[58] Field of Search ............................. 370/18, 60, 94.1, 370/50, 70, 19, 85.2, 24, 21, 310, 313, 320, 329, 331, 335, 342, 350, 441, 479, 465, 467, 474, 208; 375/1, 14, 11, 12, 13, 15, 16, 200, 232, 229, 230, 231, 235, 236, 356, 205; 380/34; 455/422, 38.1

[56] References Cited

U.S. PATENT DOCUMENTS

| | | | |
|---|---|---|---|
| 5,068,916 | 11/1991 | Harrison et al. | 375/356 |
| 5,257,257 | 10/1993 | Chen et al. | 370/18 |
| 5,315,584 | 5/1994 | Savary et al. | 370/18 |
| 5,341,395 | 8/1994 | Bi | 370/18 |
| 5,353,300 | 10/1994 | Lee et al. | 370/18 |
| 5,406,550 | 4/1995 | McTiffin | 370/18 |
| 5,408,237 | 4/1995 | Patterson et al. | 342/354 |
| 5,410,568 | 4/1995 | Schilling | 370/18 |
| 5,461,610 | 10/1995 | Weerackody | 370/18 |

OTHER PUBLICATIONS

Handouts received in three day class entitled "Wireless Information Networks" by David Goodman of Rutgers University, presented at U S west on Mar. 17–Mar. 19, 1993.

*Primary Examiner*—Dang Ton
*Attorney, Agent, or Firm*—Brooks & Kushman P.C.

[57] ABSTRACT

A method is disclosed for communicating a datagram in a wireless communication network. The network includes a transmitter and a receiver. The method begins with the step of identifying a transmitting signal shape code. The next step of the method uses signal shape code to transmit a signal representing a datagram. The method continues with the steps of identifying a receiving signal shape code and receiving at the receiver the transmitted signal. Once received, the signal is filtering based on the receiving signal shape code. The method concludes with the step of processing the filtered signal. A system is disclosed for carrying out the above described method.

12 Claims, 3 Drawing Sheets

METHOD AND SYSTEM FOR WIRELESS COMMUNICATION OF A DATAGRAM

TECHNICAL FIELD

This invention relates generally to data communication within packet-switched networks. In particular, this invention relates to methods and systems for communicating datagrams across a network having wireless terminals.

BACKGROUND ART

Data communication networks have existed since about 1950. In the late 1960s, researchers began investigating packet-switching technology.

In a packet-switched communication system, messages are exchanged among users by transmitting a sequence of packets. Typically, the sending terminal equipment partitions and disassembles a message into a sequence of packets. The packets are transmitted across the network. The receiving terminal equipment receives and reassembles the packets into the message.

Packet-switched networks can provide two types of communication service: connection-oriented service and connectionless service. In a connection-oriented service, a connection must be established between the sending terminal equipment and the receiving terminal equipment before communication between the terminals can occur. In other words, the path to be traversed through the network must be established during a call set-up procedure.

In a connectionless service, users may transmit individually addressed packets without performing a call set-up procedure. The individually addressed packets are commonly referred to as datagrams. Although the connectionless service avoids the call set-up procedure, complete address information is required to be included with each datagram.

Presently, in order for a mobile computing user to participate in inter-network communications, the user must first interface with a wireless data communication network. Typically, wireless data communication networks are based on radio, satellite or microwave technologies. One example of a wireless data communication network is a cellular telephone network.

Most wireless data communication networks today employ packet-switching technology with connection-oriented service. As discussed, this requires the mobile computing user to initiate a call set-up procedure to establish a connection to a second network through the wireless network.

In many cases, the second network provides connectionless service employing datagrams. The linking of these two networks, the first connection-oriented mobile network and the second connectionless network, require the overhead from both types of services. Not only does a call set-up procedure need to be executed, but also each datagram must contain complete address information.

DISCLOSURE OF THE INVENTION

A need therefore has developed to provide a method and system for more efficiently utilizing the capacity of wireless data communication networks. More particularly, a need has developed to provide an efficient and cost effective service in a wireless data communication network which is compatible with existing networks employing datagrams.

The present invention described and disclosed herein comprises a method and system for communicating a datagram in a wireless communication network.

It is an object of the present invention to provide a method and system for providing connectionless service to communicate a datagram in a wireless data communication network.

It is another object of the present invention to provide a method and system for communicating a datagram in a wireless data communication network which is compatible with existing inter-network protocols.

It is yet another object of the present invention to provide a method and system for communicating a datagram in a wireless data communication network which is compatible with CDMA wireless communications.

In carrying out the above objects and other objects of the present invention, a first method is provided for communicating a datagram in a wireless communication network. The wireless communication network includes a transmitter for sending a message and a receiver for receiving a message.

The method begins with the step of identifying a transmitting signal shape code. Preferably, the signal shaped code is a CDMA user code. The method includes the step of transmitting from the transmitter a signal representing a datagram. This step is performed based on the transmitting signal shape code.

The method further includes the steps of identifying a receiving signal shape code and receiving the transmitted signal at the receiver. The method continues with the step of filtering the received signal based on the receiving signal shape code. Finally, the method concludes with the step of processing the filtered signal.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1:
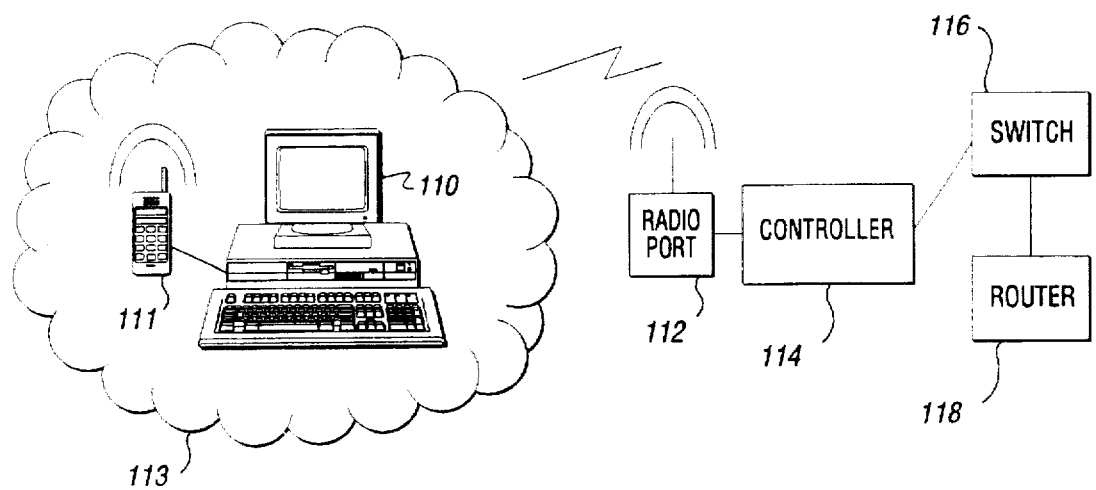
FIG. 1 is a functional schematic diagram illustrating the hardware of a prior art wireless communication service.

Referring now to the drawings, FIG. 1 illustrates the hardware of a typical prior art wireless communication network. The illustrated wireless communication network employs only connection-oriented service.

To utilize the illustrated network for internetwork mobile computing, a user employs personal computer 110 to communicate through the wireless network with a second network. Personal computer 110 includes programming to communicate with the second network using a standard protocol such as internet protocol (IP). Although IP is currently the industry standard, other protocols have been proposed for replacing IP.

Personal computer 110 is connected to remote transceiver 111 for communication through the wireless data communication network. Although, remote transceiver 111 is shown external to personal computer 110, an internally installed transceiver is an acceptable alternative and is illustrated as wireless terminal 113.

Wireless terminal 113 communicates with radio port 112 using CDMA radio signals. The CDMA radio signals represent data communicated to and from wireless terminal 113.

Radio port 112 is connected to radio port controller 114 which includes control logic for operating radio port 112. Radio port controller, among other things, controls the CDMA signal shaping which permits communication between radio port 112 and wireless terminal 113.

Radio port controller 114 is connected to telephone switch 116 for communication across a public switched telephone network. Ultimately, telephone switch 116 is connected to IP router 118.

IP router 118 is responsible for routing data between the public switched telephone network and the second network with which wireless terminal 113 is communicating. In order for wireless terminal 113 to communicate with the second network, a conversion must occur between the connection oriented service of the first network and the connectionless service of the second network.

Figure 2:
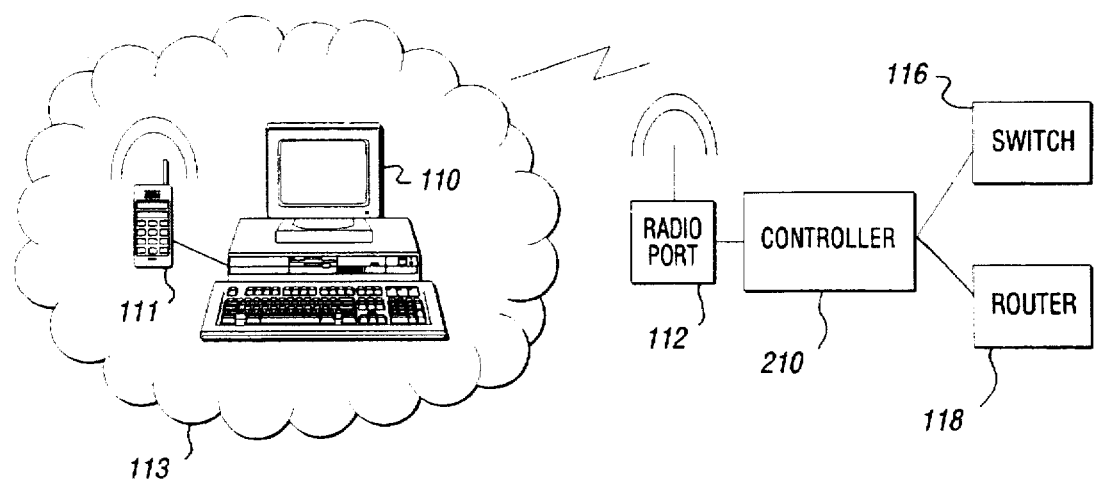
FIG. 2 is a functional schematic diagram illustrating the hardware of a wireless communication service in accordance with the present invention.

FIG. 2 illustrates the hardware of a wireless communication service which supports CDMA datagrams in accordance with the present invention. The illustrated wireless communication network not only employs connection-oriented service for communication with a public switched telephone company, but also connectionless service for communication with IP and other connectionless networks.

Like the wireless network illustrated in FIG. 1, a mobile computing user employs personal computer 110 to communicate with a distant IP compatible network. Remote transceiver 111, which could be part of wireless terminal 113, and radio port 112 act as the nodes of a CDMA radio communication link.

As shown in FIG. 2, to achieve the desired communication contemplated by the present invention, there is provided a radio port controller 210 which is connected to radio port 112, telephone switch 116 and IP router 118.

Control logic included in radio port controller 210 directs communication between radio port 112 and either switch 116 or IP router 118 depending on the requirements of wireless terminal 113. For example, if a signal representing a datagram is sent from wireless terminal 113 addressed to the second network, the control logic of radio port controller 210 directs the signal to IP router 118. If, however, the radio port controller 210 receives a signal requesting a direct connection, the control logic directs the received signal to telephone switch 116.

Preferably, the communication between radio port 112 and wireless terminal 113 is based on a CDMA user coding scheme currently employed by companies such as Qualcomm and Motorola. Under coding schemes employed by these companies, each user of the wireless network is allocated a distinct 42 bit code. Consequently, this coding scheme can theoretically support $2^{42}$ codes. The number of concurrent users is, of course, limited by the bandwidth and the capacity of the radio communication trunk.

In existing CDMA implementations, codes are allocated at transmission time to ensure that they are orthogonal, which increases transmission reliability. While CDMA can also work with semi-orthogonal codes, transmission quality is reduced as orthogonality is reduced. Every distinct code is at least semi-orthogonal with every other code. In this fashion, CDMA allows any entity to transmit at any time as long as they have distinct orthogonal codes.

Figure 3:
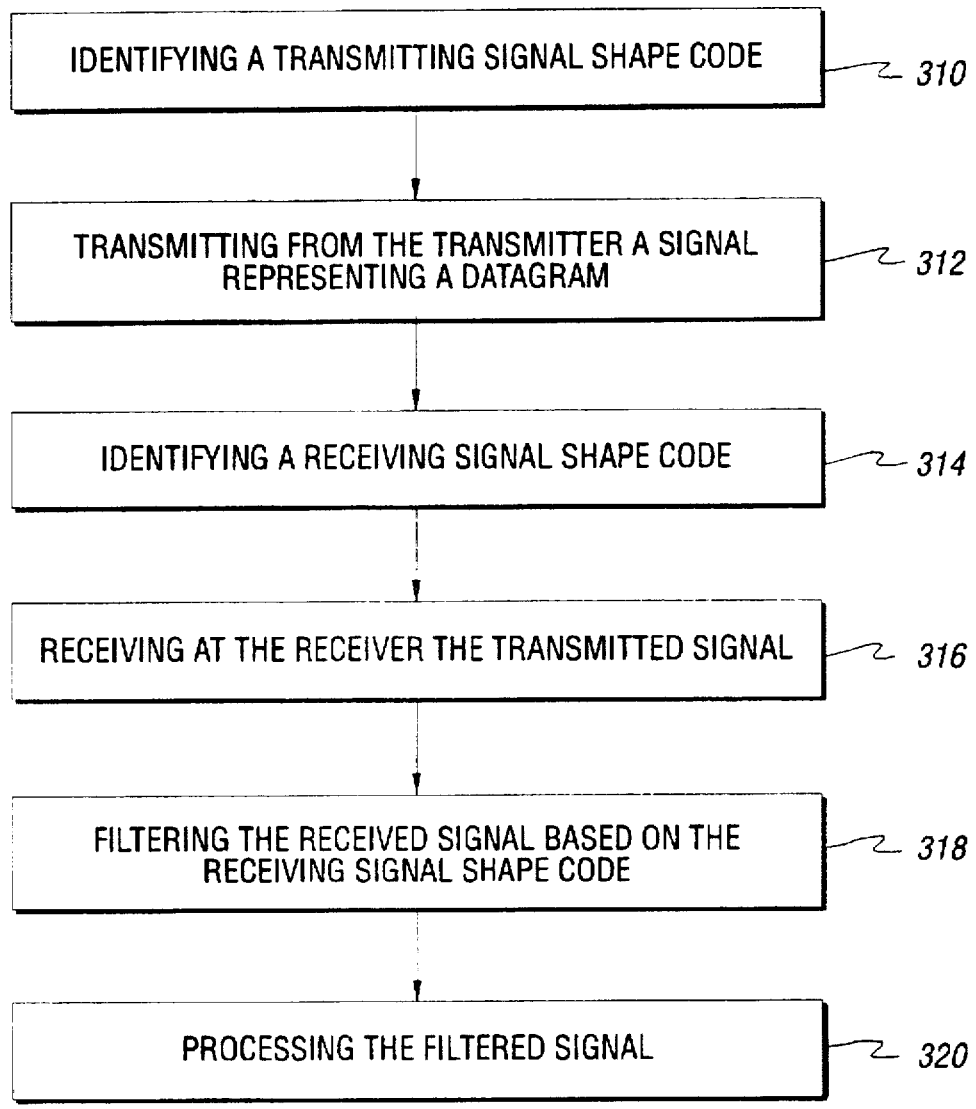
FIG. 3 is a flowchart illustrating the method steps of the present invention.

Referring now to FIG. 3, there is illustrated a flowchart describing the method steps of the present invention. Block 310 illustrates the step of identifying a transmitting signal shape code.

If a datagram is being sent from the second network to wireless terminal 113, this step includes the step of converting a destination datagram address into a CDMA user code. If the datagram is being sent from wireless terminal 113 to the second network, block 310 includes the step of identifying the CDMA user code associated with wireless terminal 113. Two distinct CDMA codes are used: a first for sending datagrams from wireless terminal 113 and a second for receiving datagrams at wireless terminal 113.

Block 312 illustrates the step of transmitting from the transmitter a signal representing a datagram. Block 312 includes the step of shaping the transmitted signal based on the CDMA user code. The CDMA user code is also known as a signal shape code.

Block 314 shows the step of identifying a receiving signal shape code. If a datagram is being sent from the second network to wireless terminal 113, this step is performed by wireless terminal 113 and includes the step of identifying the CDMA user code associated with wireless terminal 113. If the datagram is being sent from wireless terminal 113 to the second network, this step is performed by radio port 112.

Block 316 illustrates the step of receiving the transmitted signal at the receiver. The received signal is filtered as shown at block 318. The step of filtering the received signal is based on the receiving signal shape code. If the transmitting signal shape code and the receiving signal shape code are compatible, the signal is passed on for processing. The step of processing, shown at block 320, is performed by wireless terminal 113 if a datagram originated at the second network.

The step of processing is performed by radio port controller 210 for all datagrams originating from wireless terminal 113. In this case, the step of processing includes converting the receiving signal shape code into source address data. This data is inserted into a header associated with the datagram.

Figure 4:
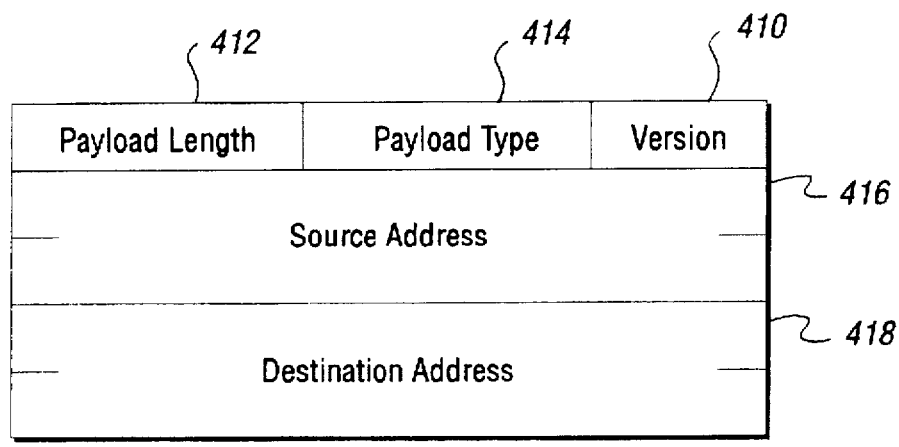
FIG. 4 is a block diagram illustrating a representative physical layer datagram header.

Referring now to FIG. 4, a representative physical layer datagram header is illustrated which can be used in accordance with the present invention. This header facilitates the transmission of datagrams between IP router 118 and wireless terminal 113.

The illustrated header includes the following fields: version 410, payload length 412, payload type 414, source address 416 and destination address 418. When a packet is sent from the second network to wireless terminal 113, the radio port controller 112 is responsible for directing the packet to the appropriate address. The radio port controller 210 must translate the destination address of the header into a destination CDMA user code.

The translation process can be implemented using a lookup table or a defined mathematical relationship between the CDMA user codes and the physical addresses. To continue the datagram transmission from the second network to wireless terminal 113, radio port controller 114 directs radio port 112 to transmit the datagram using the destination CDMA user code.

A transmission originating at wireless terminal 113 requires a similar translation. In this case, wireless terminal 113 includes control logic which translates the source address into a source CDMA user code. The datagram is transmitted to radio port 112 using the source CDMA user code.

Figure 5:
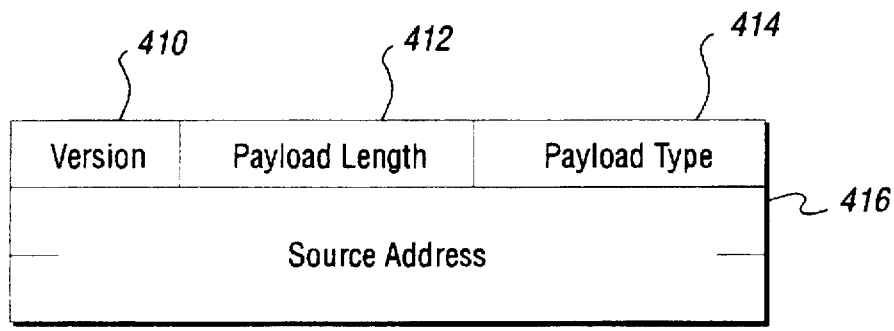
FIG. 5 is a block diagram illustrating a first wireless network datagram header used in accordance with the present invention.

FIG. 5 illustrates a first wireless network datagram header which is used when transmitting a datagram from radio port 112 to wireless terminal 113. This header requires only the following fields: version 410, payload length 412, payload type 414 and source address 416.

This header does not require a destination address because the destination of the datagram is mapped into the CDMA user code. Once the destination address is translated into a CDMA user code, the user associated with the CDMA user code will receive the datagram.

Figure 6:
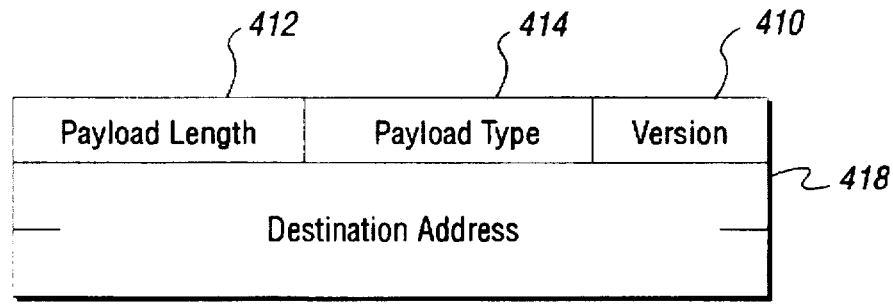
FIG. 6 is a block diagram illustrating a second wireless network datagram header used in accordance with the present invention.

FIG. 6 illustrates a second wireless network datagram header which is used when transmitting a datagram from wireless terminal 113 to radio port 112. This header requires most of the information contained in the header of FIG. 4 including the following fields: version 410, payload length 412, payload type 414, and destination address 418. This header does not require a source address. The source address is obtained by translating the CDMA user code into a source address.

While the best mode for carrying out the invention has been described in detail, those familiar with the art to which this invention relates will recognize various alternative designs and embodiments for practicing the invention as defined by the following claims.

What is claimed is:

1. A method for wireless communication of a datagram including an address in a connection-less network including a transmitter and a receiver, the method comprising:

mapping the address of the datagram to a signal shape code;

transmitting via the transmitter a wireless signal representing the datagram;

receiving via the receiver the transmitted signal;

comparing the signal shape code of the transmitted signal to a predetermined signal shape code representing the address of the receiver; and processing the transmitted signal when the signal shape code of the transmitted signal corresponds to the predetermined signal shape code.

2. The method of claim 1 wherein the step of transmitting is based on CDMA.

3. The method of claim 2 wherein the step of mapping the address of the datagram to a signal shape code includes converting a header address to a CDMA user code.

4. The method of claim 1 wherein the signal shape code is an orthogonal signal shape code.

5. The method of claim 1 wherein the transmitter is a stationary radio port and the datagram includes a header having:

a version field;

a payload length field;

a payload type field; and a source address field.

6. The method of claim 1 wherein the transmitter is a remote transceiver and the datagram includes a header having:

a version field;

a payload length field;

a payload type field; and a destination address field.

7. A system for wireless communication of a datagram including an address in a connection-less network, the system comprising:

means for mapping the address of the datagram to a signal shape code;

means for transmitting a wireless signal representing the datagram;

means for receiving the transmitted signal;

means for comparing the signal shape code of the transmitted signal to a predetermined signal shape code representing the address of the receiver; and means for processing the transmitted signal when the signal shape code of the transmitted signal corresponds to the predetermined signal shape code.

8. The system of claim 7 wherein the means for transmitting is based on CDMA.

9. The system of claim 8 wherein the means for mapping the address of the datagram to a signal shape code includes means for converting a header address to a CDMA user code.

10. The system of claim 7 wherein the signal shape code is an orthogonal signal shape code.

11. The system of claim 7 wherein the transmitter is a stationary radio port and the datagram includes a header having:

a version field;

a payload length field;

a payload type field; and a source address field.

12. The system of claim 7 wherein the transmitter is a remote transceiver and the datagram includes a header having:

a version field;

a payload length field;

a payload type field; and a destination address field.

* * * * *